United States Patent Office 2,923,039
Patented Feb. 2, 1960

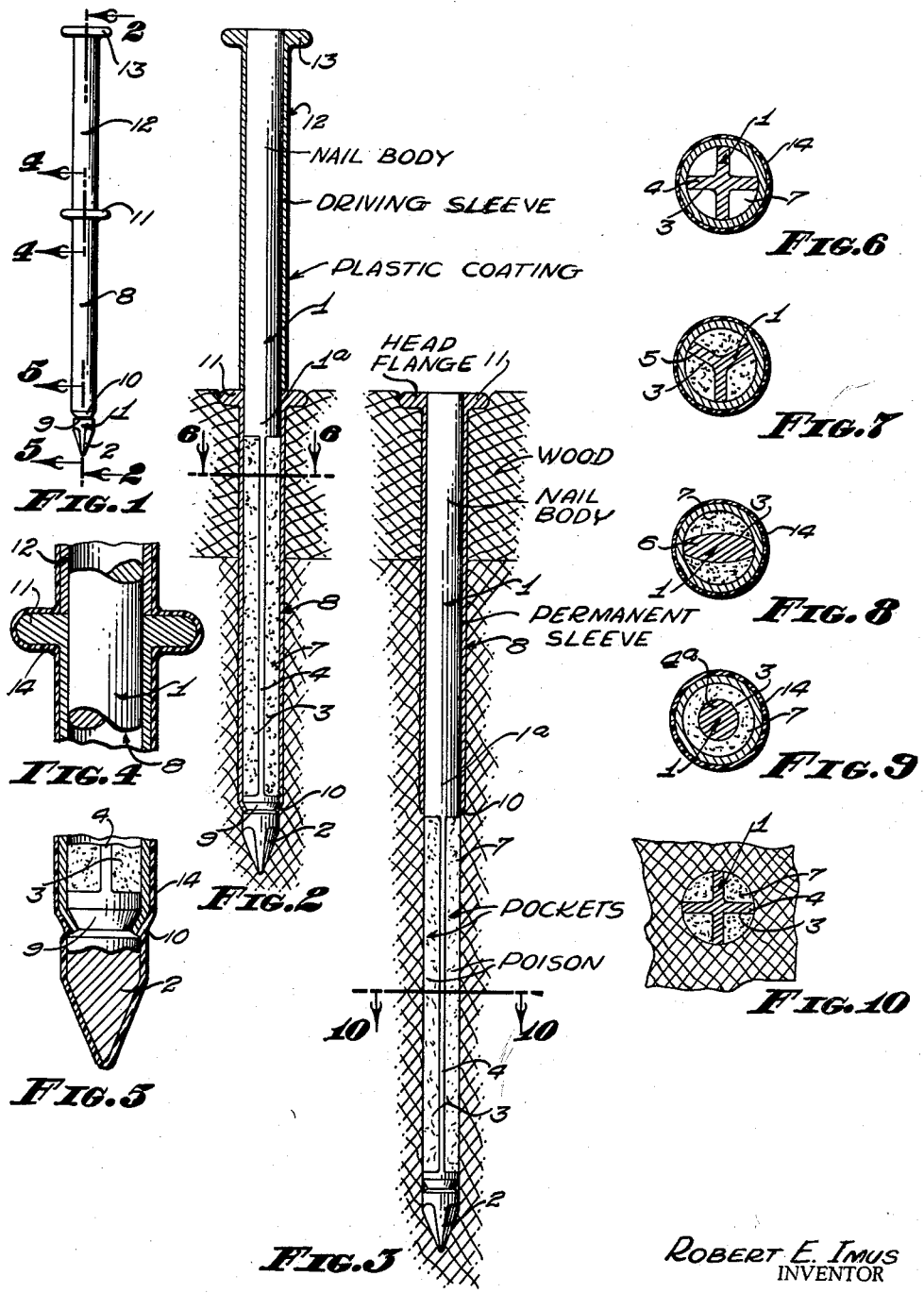

2,923,039

TERMITE POISONING NAIL

Robert E. Imus, Sierra Madre, Calif.

Application February 21, 1957, Serial No. 641,736

7 Claims. (Cl. 21—73)

This invention relates to a poison applicator for termites or other wood boring insects, and is a continuation-in-part of previously filed application Serial No. 379,874, filed September 14, 1953, now abandoned, for "Poison Applicator for Termites and Other Wood Boring Insects." Included in the objects of this invention are:

First, to provide a poison application in the form of a nail capable of being driven into wood, such as the studding, top and bottom plates, rafters and joists, and underpinning of a frame building.

Second, to provide a termite poisoning nail which deposits a quantity of poison well into the interior of the wood member so as to establish a thoroughly poisoned region in the path of travel of wood boring insects, such as termites.

Third, to provide a termite poisoning nail which may be used as an ordinary nail for fastening purposes in new construction so that when used in strategic points in a frame construction the possibility of future infestation is reduced to a minimum, and, in any case, migration for any appreciable distance is prevented.

Fourth, to provide a termite poisoning nail which is not limited to use in new construction, but may be used in old frame construction to stop infestation, the poisoning nails being driven into the region of infestation to intersect the passages or runways, or in proximity thereto.

Fifth, to provide a termite poisoning nail wherein the poison is sealed therein and remains sealed therein until the device is driven well into the wood member so that the danger of poisoning workers or others who may handle the devices is minimized, thus enabling the use of strong poisons capable of killing entire colonies of insects.

Other objects and advantages of this invention will be apparent from the following detailed description of preferred embodiments thereof, as illustrated in the accompanying drawings in which:

Figure 1 is a side view of the termite poisoning nail before use;

Fig. 2 is an enlarged sectional view thereof taken through 2—2 of Fig. 1, and showing the nail driven partly into the wood;

Fig. 3 is a sectional view similar to Fig. 2, showing the nail after being completely driven into the wood;

Figs. 4 and 5 are further enlarged fragmentary sectional views through 4—4 and 5—5 of Fig. 1, showing the plastic coating over the nail;

Fig. 6 is an enlarged transverse sectional view through 6—6 of Fig. 2;

Figs. 7, 8, and 9 are transverse sectional views similar to Fig. 6, showing modified forms of the nail construction;

Fig. 10 is an enlarged transverse sectional view through 10—10 of Fig. 3.

The termite poisoning nail includes a nail body 1 having a pointed end 2. The sides of the nail body adjacent the pointed end 2 are cut away to form elongated grooves or pockets 3. This may be accomplished by milling or forging the nail body to form four radiating webs 4, as shown in Figs. 1 through 6 and 9, or arranging the webs in Y form, as indicated by 5 in Fig. 7, or by providing a diametrical web 6 which may have convex sides, as shown in Fig. 8; or by merely reducing the diameter of the nail, as indicated by 4a.

The pockets 3 are filled with a termite poison 7, preferably in the form of a powder. The pockets 3 are initially closed by a permanent sleeve 8 which fits over the nail body 1.

The nail body 1 between the pockets 3 and the pointed end 2 is provided with a groove 9, and the corresponding extremity of the permanent sleeve 8 is inturned to form a lip 10 which initially fits into the groove 9. The opposite end of the permanent sleeve 8 extends beyond the pockets 3 and terminates in a head flange 11. The pockets 3 and permanent sleeve 8 may occupy approximately half the total length of the nail.

The protruding end of the nail body 1 beyond the permanent sleeve 8 forms a piston 1a which is initially covered by a driving sleeve 12, one end of which bears against the permanent sleeve 8 and the other end of which is initially flush with the ends of the nail body 1 and is provided with a head flange 13.

The entire nail structure is dipped or otherwise provided with a coating of plastic material 14 which seals the ends of the permanent sleeve 8 so that no poison may escape prior to use of the nail.

The termite poisoning nail is employed as follows:

The nail is hammer driven, in the manner of a conventional nail, into the wood until the head flange 11 of the permanent sleeve 8 is substantially flush with the surface of the wood; thereupon, with the use of a hammer, the driving sleeve 12 is pulled from the nail body 1. The nail body is then hammer driven further into the wood until its outer end is flush with the head flange 11. In doing so, the pointed end 2 is forced further into the wood, forming a cylindrical hole therein, and simultaneously the piston 1a ejects the poison into the hole thus formed so that the poison is brought into direct contact with the surrounding wood.

It should be noted that the sleeve 8 may be slightly larger than the pointed end 2. During the initial driving of the permanent sleeve into the wood, the load is applied to the nail body and to both sleeves so that the connection between the inturned lip 10 and the groove 9 remains intact. Once the driving sleeve 12 is removed, impact on the nail body 1 readily spreads the lip 10 to permit continued movement of the pointed end of the nail into the wood.

While a powdered poison is illustrated, it should be noted that the poison may be in a semisolid or even a liquid form, as it is initially completely sealed in the pockets 3. If in semisolid or liquid form, it will tend to penetrate a short distance into the surrounding wood. Furthermore, the poison may be such as to react with the moisture in the wood to form a gas or solid which penetrates the surrounding wood.

It should be noted that the nail may be of such diameter and length that it may be used in place of conventional nails for the fastening of studding, joists, or rafters, and thus serves not only as a poison applicator but also as a fastening or securing device. If used as a securing device, the permanent sleeve should, of course, extend beyond the juncture between the wood members joined by the nail, as indicated in Figs. 2 and 3. Under these conditions the termite poisoning nail may have a sheer strength comparable to a conventional nail.

It should be observed, however, that the termite poisoning nail is not limited in its use to the joining of the structural members of a house, but may be driven at other appropriate points along rafters, studding, and joists. Furthermore, the termite poisoning nail is not limited to new construction, but may be employed in old construction wherever termite infestation is suspected or is likely to occur.

Due to the fact that the poison is initially sealed within the nail, a strong poison may be used. Furthermore, by reason of the fact that the nail is applicable to the joining of such structural members as joists, studding, rafters, plates, brace members, and flooring, a termite colony cannot advance beyond the nails joining these members so that the infestation is killed before a structural damage can occur.

It should also be observed that the diameter of the nail body adjacent its pointed end is essentially the same as the inside diameter of the sleeve. Consequently, the volume of the chamber formed in the wood is substantially the same as the volume of the chamber initially provided between the sleeve and nail body. Thus, if the poison is initially packed in the sleeve, it remains packed in the cavity formed in the wood. The poison is, in effect, transported intact from within the sleeve to the cavity formed in the wood.

Having fully described the invention, it is to be understood that I do not wish to be limited to the details herein set forth, but the invention is of the full scope of the appended claims.

What is claimed is:

1. A poison applicator for wood boring insects, comprising: a nail structure pointed at one end and having a solid shank portion terminating in an impact receiving end remote from said pointed end; a sleeve initially disposed adjacent the pointed end of said nail structure; said nail structure and sleeve defining an initially closed poison compartment adjacent said pointed end; said nail structure and sleeve adapted to be hammer driven in unison partially into a body of wood; and means for restraining said sleeve on partial entry of said nail structure to permit said nail structure to be hammer driven further into said body of wood and form a cavity in the wood beyond said sleeve, whereby said cavity is filled with said poison transported from said compartment by movement of said nail structure thereby to expose the fibers of the wood to the poison; said nail structure and sleeve having an initially interlocking groove and flange means and said sleeve having a head at its end remote from the pointed end of said nail structure to arrest penetration of said sleeve, said groove and flange means arranged thereupon to fail and permit said continued penetration of said nail structure.

2. A poison applicator for wood boring insects, comprising: a solid nail body having a nail point at one end and a reduced cross sectional area for a portion of its length adjacent said nail point; a sleeve initially covering said portion of reduced area to form therewith a longitudinally extending poison receiving compartment; a mobile poison filling said compartment; said sleeve having a head at its end remote from said nail point and said nail body having an outer end protruding from said head to form a striking end; said nail body and sleeve adapted to be driven in unison as a nail into a body of wood until movement of said sleeve is arrested by said head, said nail body adapted to be driven further as a nail until its outer end is flush with said head to cause its portion of reduced cross section to penetrate further into the wood body and carry said poison therewith into said wood body and expose the fibers thereof to the poison.

3. A poison applicator as set forth in claim 2, wherein: said nail body and sleeve have initially interlocking means to retain said sleeve in place on said nail body until said head engages said body of wood, said means adapted thereupon to fail thereby to permit further penetration of said nail body into said body of wood.

4. A termite poisoning nail, comprising: a nail body having a pointed end; a first sleeve covering said nail body adjacent said pointed end and forming with the nail body a poison compartment; a poison in said compartment; a second sleeve axially abutting the first sleeve and extending to the end of said nail body remote from its pointed end; said remote end of the nail body and the corresponding end of said second sleeve constituting impact receiving means to drive said nail body and first sleeve into a wooden member; said second sleeve being removable thereby to permit further driving of said nail body into the wooden member beyond said first sleeve and open said poison compartment.

5. A termite poisoning nail as set forth in claim 4, wherein: the exterior of said sleeves and exposed parts of said nail body are covered with a sealing compound.

6. A termite poisoning nail, comprising: a nail body having an impact receiving end, a piston portion adjacent said end, a portion of reduced cross section beyond said piston portion, and a pointed end remote from said impact receiving end; a sleeve slidable on said nail body and initially covering said portion of reduced cross section to form therewith a poison compartment, with said piston portion protruding from one end and the pointed end of said nail body protruding from the other end of said sleeve; a poison in said compartment; a means initially covering said piston portion and arranged to transmit impact from the impact end of said nail body to said sleeve whereby said sleeve and nail body may be driven in unison into a wooden member, said means being removable from said piston portion whereby said piston portion may be driven into said sleeve to cause the pointed end to penetrate further into said wooden member, to form a hole therein while said piston ejects poison from said sleeve into said hole.

7. A termite poisoning nail as set forth in claim 6, wherein: the exterior of said sleeve and nail body are covered with a sealing compound.

References Cited in the file of this patent

UNITED STATES PATENTS

| | | |
|---|---|---|
| 1,856,809 | Gibson | May 21, 1932 |
| 2,173,966 | Jackson | Sept. 26, 1939 |

FOREIGN PATENTS

| | | |
|---|---|---|
| 687,333 | France | Aug. 7, 1930 |